United States Patent
Suzuki et al.

(10) Patent No.: US 6,739,034 B2
(45) Date of Patent: May 25, 2004

(54) ASSEMBLING APPARATUS FOR ELECTRICAL MACHINE HAVING PERMANENTLY MAGNETIZED FIELD MAGNETS

(75) Inventors: Akira Suzuki, Mori-machi (JP); Kenji Nagai, Mori-machi (JP); Hiroaki Kondo, Mori-machi (JP)

(73) Assignee: Kabushiki Kaisha Moric, Shuuchi-gun (JP)

( * ) Notice: Subject to any disclaimer, the term of this patent is extended or adjusted under 35 U.S.C. 154(b) by 140 days.

(21) Appl. No.: 09/800,709

(22) Filed: Mar. 7, 2001

(65) Prior Publication Data
US 2001/0020324 A1 Sep. 13, 2001

(30) Foreign Application Priority Data
Mar. 7, 2000 (JP) .................................. 2000-061354

(51) Int. Cl.[7] .......................... H02K 15/00; B23P 19/00
(52) U.S. Cl. .............................. 29/732; 29/596; 29/598; 29/736; 29/469; 242/432.2; 242/432.4
(58) Field of Search ......................... 29/732, 736, 799, 29/598, 596, 469; 198/465.1; 242/432.2, 432.4; 310/254, 42

(56) References Cited

U.S. PATENT DOCUMENTS

| 5,065,499 A | * | 11/1991 | Luciano et al. ............... 29/799 |
|---|---|---|---|
| 5,227,686 A | | 7/1993 | Ogawa |
| 5,272,803 A | | 12/1993 | Harrison |
| 5,323,530 A | * | 6/1994 | Goto et al. .................... 29/771 |
| 5,325,575 A | * | 7/1994 | Ichikawa .................... 29/281.3 |
| 5,445,333 A | * | 8/1995 | Bradfute .................... 242/7.05 |
| 5,495,660 A | * | 3/1996 | Choi ........................... 29/732 |
| 5,735,038 A | * | 4/1998 | Sakashita et al. ............. 29/736 |
| 5,964,429 A | * | 10/1999 | Burch et al. ............. 242/432.2 |
| 5,992,007 A | * | 11/1999 | Morii et al. .................. 29/705 |
| 2001/0020324 A1 | * | 9/2001 | Suzuki et al. ................. 29/732 |

FOREIGN PATENT DOCUMENTS

| EP | 0671806 | | 9/1995 |
|---|---|---|---|
| JP | 2001-251817 | * | 9/2001 |

* cited by examiner

Primary Examiner—Carl J. Arbes
Assistant Examiner—Minh Trinh
(74) Attorney, Agent, or Firm—Ernest A Beutler

(57) ABSTRACT

An assembling apparatus for assembling rotating electrical machines having permanent magnets and armatures cores. The apparatus holds the armature core while the permanent magnets are assembled on to it thus avoiding hand labor. At all times, the rotor is supported so that it cannot cant relative to the stator and its permanent magnets and thus, no damage to the magnets or any coating thereon or to the armature will occur.

8 Claims, 6 Drawing Sheets

US 6,739,034 B2

ASSEMBLING APPARATUS FOR ELECTRICAL MACHINE HAVING PERMANENTLY MAGNETIZED FIELD MAGNETS

BACKGROUND OF INVENTION

This invention relates to an assembling apparatus for a rotating electrical machine having permanently magnetized field magnets and more particularly to an improved mechanism for assembly such machines with a minimum of hand operation.

Many types of rotating electrical machines include a stator, which has affixed to its inner shell a plurality of circumferentially spaced permanent magnets. These permanent magnets cooperate with windings that are formed on a rotor that is juxtaposed to and rotates within the stator case. Obviously, the permanent magnets have a fairly large magnetic flux and this makes manual assembly of the stator case around the rotor difficult. The reason for this is that as the armatures of the rotor move into proximity with the permanent magnets of the stator case, they will be attracted and cause physical contact. This requires considerable strength of the assembler's hands in order to prevent such contact or the permanent magnets and/or rotor could be damaged.

It has been the practiced to provide a rust proof surface treatment on the magnets; particularly in the use of neodymium-iron-boron magnets and any contact will cause this coating to be displaced. This can result in deterioration of the rust proofing quantities of the device.

It is, therefore, a principal object to this invention to provide an improved apparatus for assembling such rotation machines wherein the operator need not hold the components in spaced relationship when they are axially moved into registry with each other and so that the components will be held against engagement with each other during this assembling technique.

SUMMARY OF INVENTION

This invention is adapted to be embodied in an assembling apparatus for permanent magnet rotating electrical machines. The electrical machine includes a generally cylindrical stator case having permanent field magnets secured to an inside surface of the stator case and a rotor that is journalled by paired front and rear end closures attached to the stator case. The assembling apparatus comprises a jig for assembling and holding one end of the rotor and one of the end closures. A rotor holder smaller than the internal diameter of the stator is provided for holding the other end of the rotor in alignment with the rotational axis of the rotor. A stator case holder holds the stator case and is supported for movement along the rotor axis while holding the stator case. A driver is provided for assembling the stator case to the one end closure by relatively moving the stator case along the rotor axis while holding the other end of the rotor with the rotor holder.

DETAILED DESCRIPTION

Figure 1:
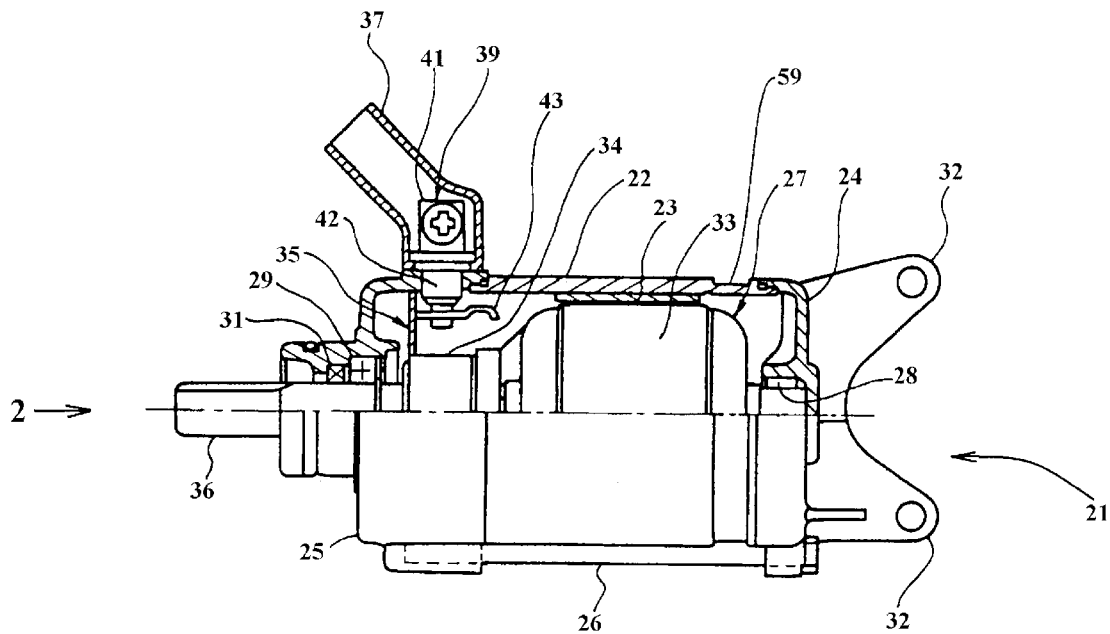
FIG. 1 is a side elevational view of a rotating electrical machine of the type, which can be assembled by the assembling apparatus hereof, with a portion broken away and shown in section.
Figure 2:
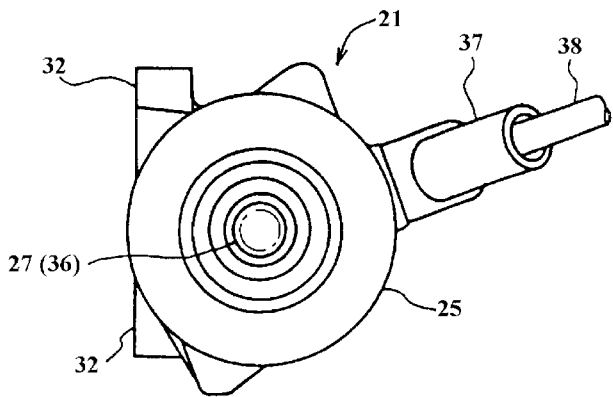
FIG. 2 is an end view of the machine looking in the direction of the arrow 2 in FIG. 1.

Referring now in details to the drawings and initially primarily to FIGS. 1 and 2, a starter motor that is assembled by a method and apparatus embodying the invention is indicated generally by the reference numeral 21. The starter motor is adapted to provide electrical starting of an associated internal combustion engine (not shown). Although the invention is described in conjunction with the starter motor, from the foregoing description, it should be apparent that the invention may also be utilized with other types of rotating electrical machines such as electrical generators or alternators.

Figure 3:
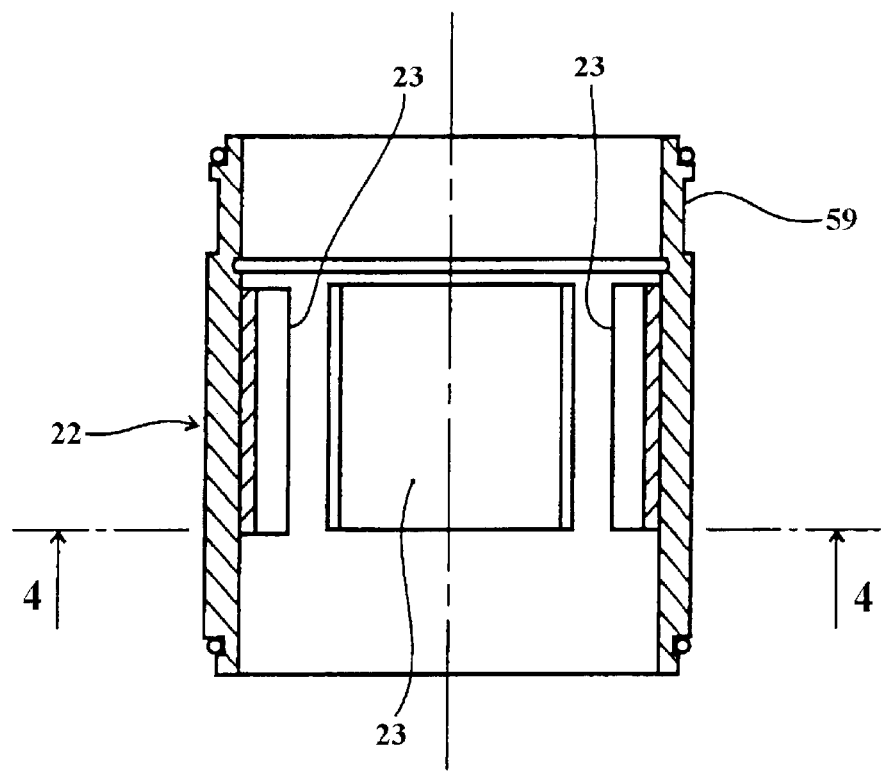
FIG. 3 is a cross sectional view taken through the stator case sharing the attached permanent magnets.
Figure 4:
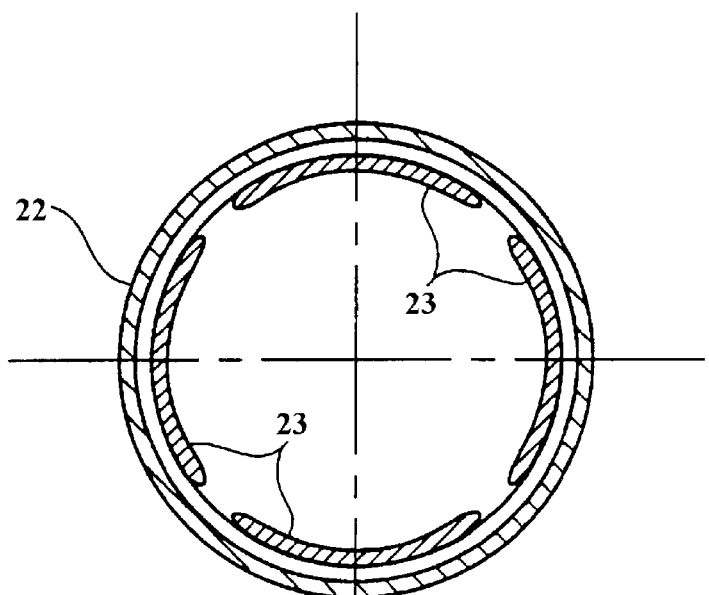
FIG. 4 is a cross sectional view taken along the line 4—4 of FIG. 3.

The starter motor 21 includes a cylindrical housing 22 which also forms a magnet carrier, as will become apparent. To this end, permanent magnets 23 are affixed by adhesive bonding in circumferentially spaced locations around a cylindrical inner surface portion of the outer housing 22. (See also FIGS. 3 and 4) The permanent magnets are formed from a magnetic material having a high flux density such as neodymium-iron-boron. Preferably the method described in the copending application entitled "ROTATING ELECTRICAL MACHINE WITH PERMANENT MAGNETS AND METHOD OF MAKING SAME", Ser. No. 09/790,959, filed Feb. 22, 2001 and assigned to the assignee hereof may be used for this purpose, although other methods are possible.

The outer housing 22 is closed at opposite ends by means of end plates or closures 24 and 25. The end plates 24 and 25 are fixed to the cylindrical housing 22 by means of a pair of elongated bolts or threaded fasteners 26, which are threaded into lugs formed on the end plate 25.

A rotor, indicated generally by the reference numeral 27 is journalled in the starter motor housing by means of bearings 28 and 29 carried by the end plates 24 and 25, respectively. An oil seal 31 is disposed adjacent the front bearing 29 while the rear bearing 28 is provided in a blind bore in the end plate 24.

The rear end plate 24 has a pair of lugs 32 that are formed with openings so as to receive fasteners for affixing it to the associated engine or body of the associated vehicle.

The rotor 27 is provided with a plurality of coil windings 33 that cooperate with the permanent magnets 23. Electrical current is fed to these windings by means of a commutator 34 that is fixed forwardly of the windings 33 and which cooperates with brushes mounted on a brush holder 35 as is known in the art. The rotor 27 has a portion 36 that protrudes from the front end plate 25 for cooperation with a flywheel starter gear (not shown) of the associated engine for its starting in a well known manner.

The front end plate 25 is provided with an electrical fitting 37 for passing an electrical cable 38 that supplies electrical current to the windings 33 of the rotor 27 through the brushes. A terminal post 39 provides one of these electrical connections through a conductor 41 that is insulated from the stator case outer housing 22 by an insulating sleeve 42. The conductor 41 supplies electrical power to the brushes (not shown) from a terminal plate 43. The other connection is provided by grounding of the housing 32 to the vehicle body or engine, in a manner well known in this art.

The apparatus for practicing the invention is shown in detail in FIGS. 5 through 10 and will now be referred to with respect to those figures. This apparatus is indicated generally by the reference numeral 44 and includes a pair of transversely spaced vertically extending guide rods 45 that are mounted on a table mechanism 46 at one side of a conveyor mechanism 47. The table mechanism 46 is moveable as shown by the arrows in FIG. 5 toward and away from the conveyor mechanism 47, which has a path movement indicated by the arrows in FIG. 6 that extends transversely to the direction of reciprocation of the table mechanism 46.

Figure 5:
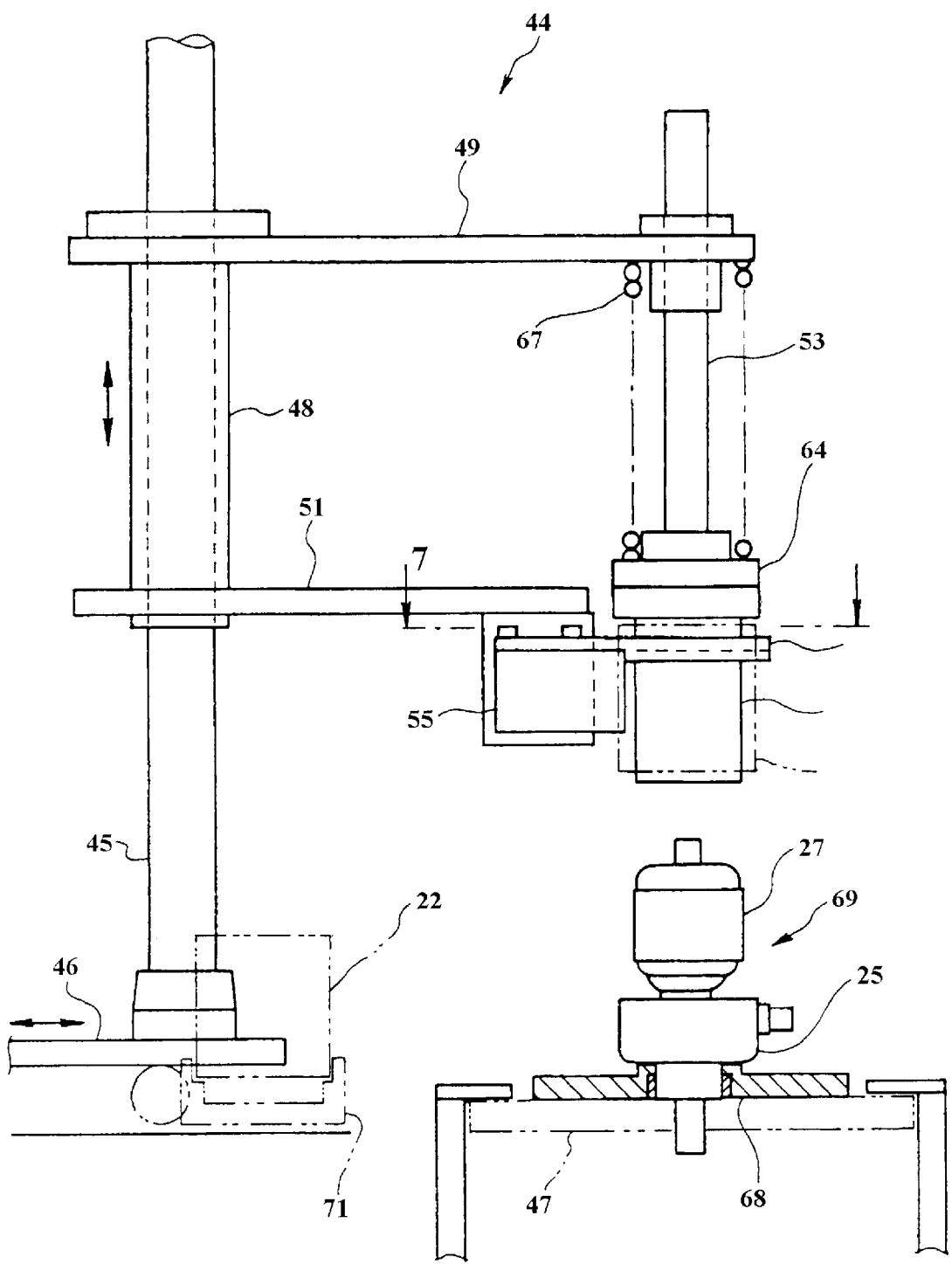
FIG. 5 is a side elevational view of the assembling apparatus showing in solid lines the condition prior to assembly of the stator case onto a supported rotor and associated end closure and intermediate positions in phantom.
Figure 6:
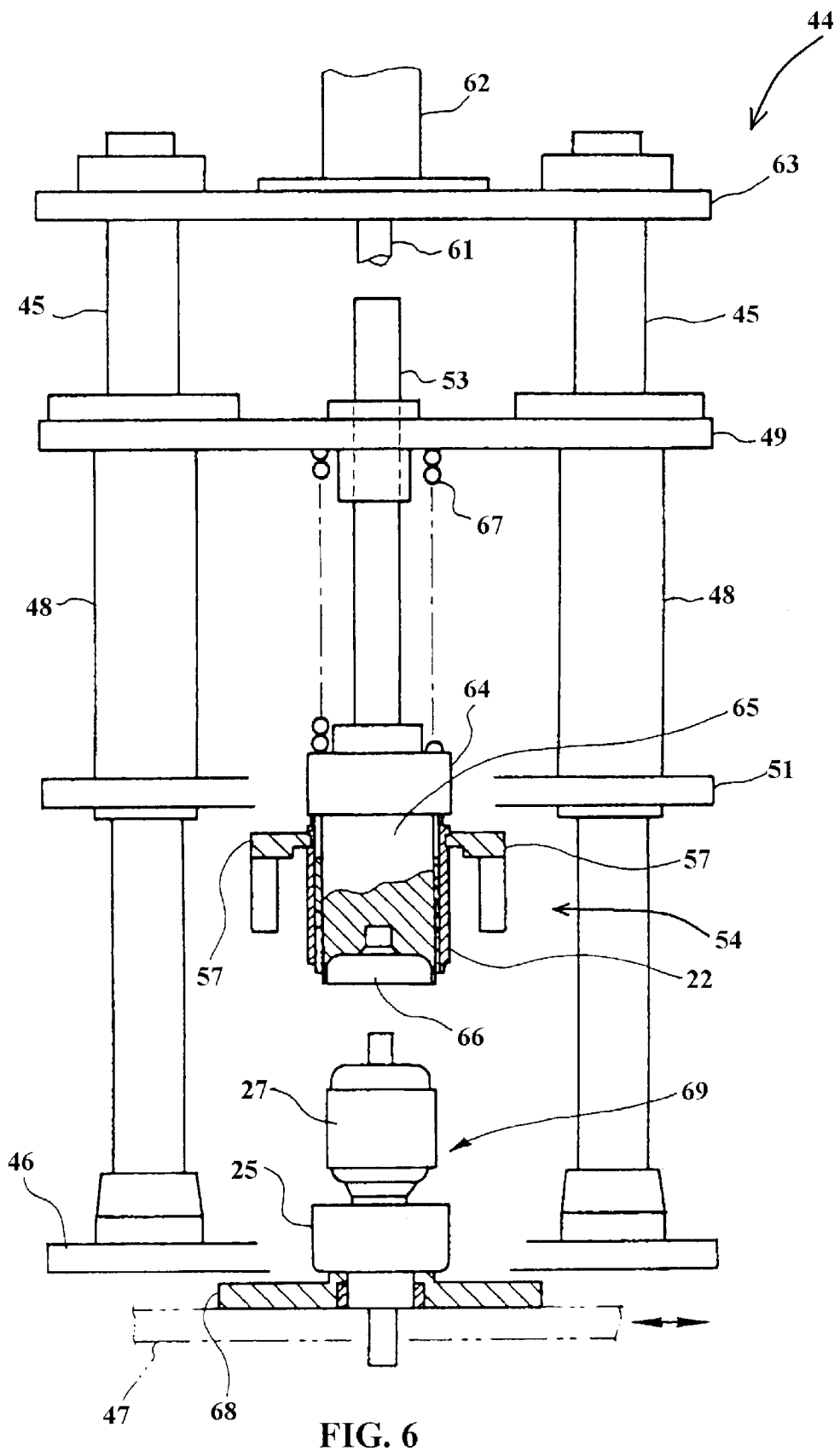
FIG. 6 is a view looking generally in a direction perpendicular to that of FIG. 5 and shows the assembling apparatus partially broken away to indicate the relation of the components to each other.
Figure 10:
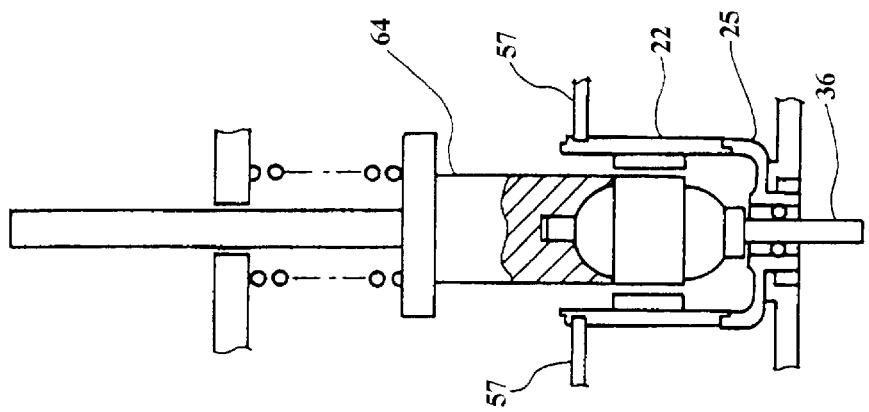
FIG. 10 is a view, in part similar to FIGS. 8 and 9, and shows the final step in the assembly operation of the stator case to the one end cap.
Figure 9:
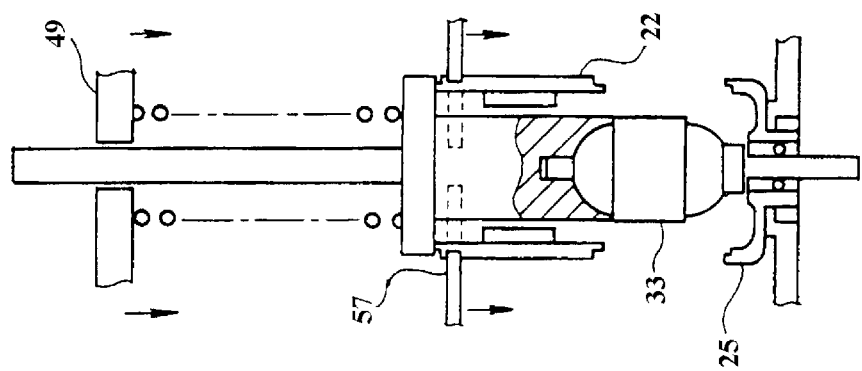
FIG. 9 is a view, in part similar to FIG. 8, and shows the second step in the assembly operation.
Figure 8:
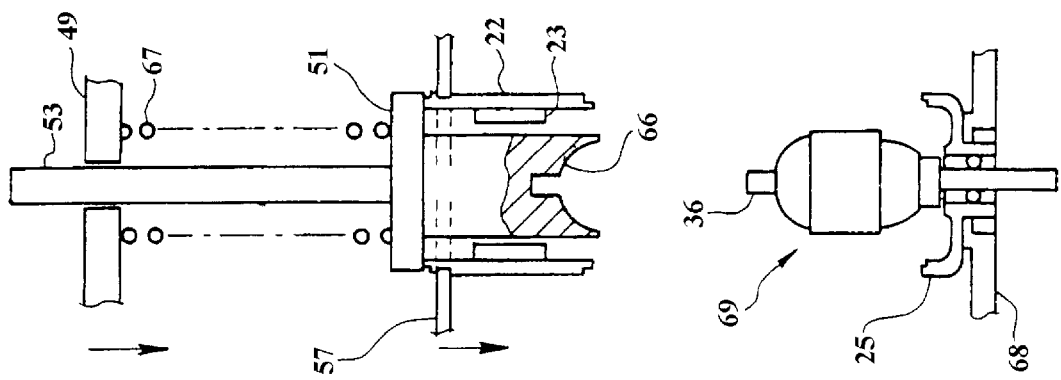
FIG. 8 is a view looking generally in the same direction as FIG. 6 and shows the first step in the assembling procedure.

A pair of tubular cylinders 48 are slidably supported upon the guide rods 45 as shown by the arrows in FIG. 5 and are connected to a pair of transversely extending support arms 49 and 51 which extend toward and above the conveyor 47 in the loading position as seen in FIGS. 5 and 6 as well as FIGS. 8 through 10.

The support plate 49 carries at its outer end a guide bushing 52 through which a support rod 53 extends. The support rod 53 depends downwardly toward the conveyor 47.

Figure 7:
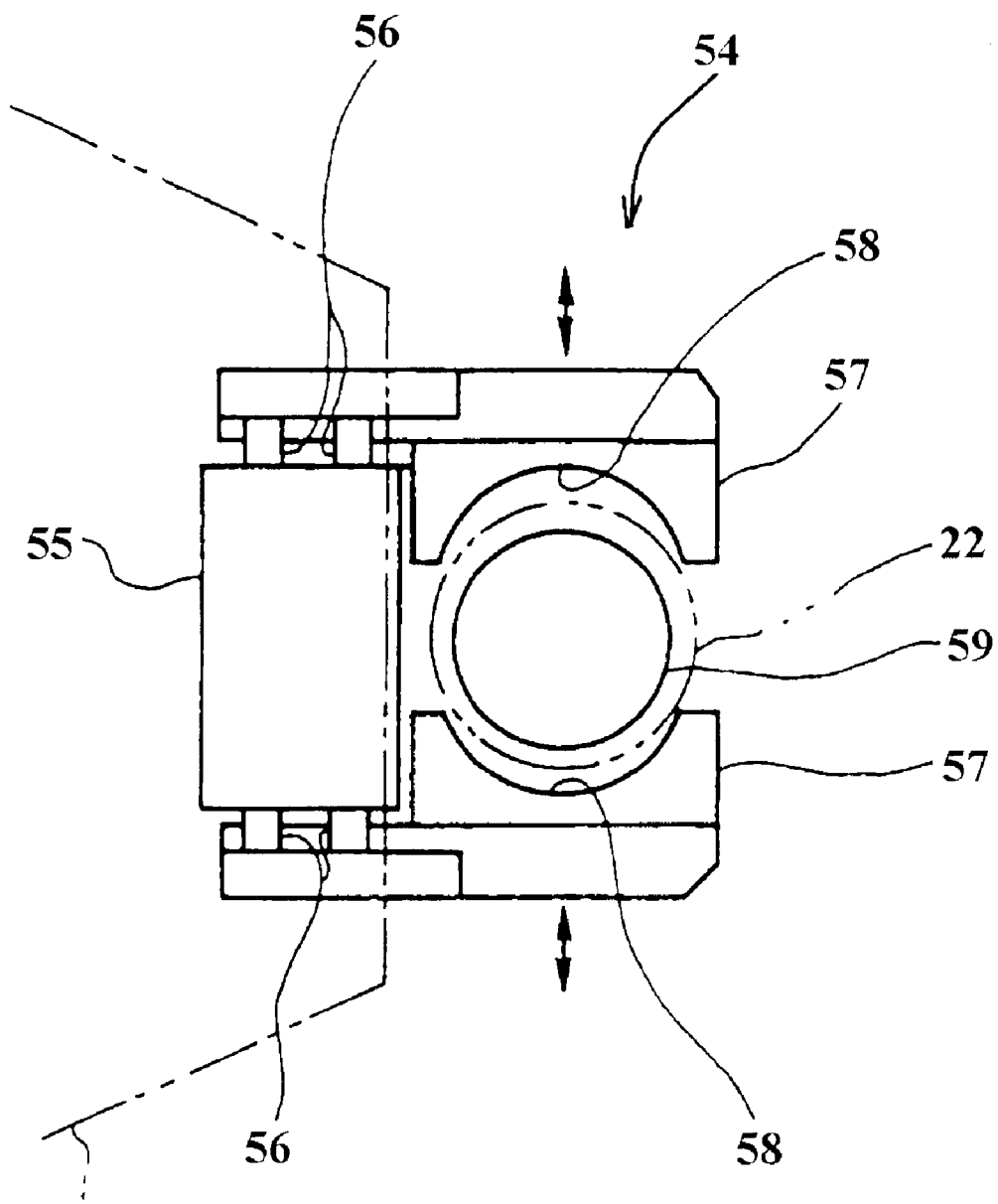
FIG. 7 is a cross sectional view taken along the line 7—7 of FIG. 5.

The lower support plate 51 carries a gripping jaw mechanism, indicated generally by the reference numeral 54, which is shown in most detail in FIG. 7 comprised of a cylinder 55 having a pair of oppositely extending piston rods 56 which are connected to gripping jaws 57 for moving the gripping jaws 57 as shown by the arrows in FIG. 7 between an opened position as shown in solid lines to a closed position.

In this closed position, circumferential bearing surfaces 58 of the gripping jaws 57 are received in a groove 59 that is formed in the cylindrical stator casing 22 at a position axially spaced from the magnets 23.

As seen in FIG. 6, the top support plate 49 has attached to it, between the posts 45, an actuating rod 61 of a pneumatic cylinder 62. This pneumatic cylinder 62 is, in turn, mounted on a cross piece 63 that is fixed to the tops of the support rods 45. Hence, when the piston rod 61 is extended, the support plates 49 and 51 and the mechanism carried by them will move upwardly and downwardly relative to the conveyor 47 in a direction as indicated by the arrows in FIGS. 5 and 8 through 10.

The guide rod 53, which is journalled within the bearing 52 of the upper plate 49, carries at its lower end a fixture 64, which, in turn, supports a rotor support 65. The rotor support 65 is formed from a plastic material and has a cylindrical outer surface that is of a larger diameter than the inner diameter of the permanent magnets 23. A lower end 66 of the rotor support 64 is formed with a shape complementary to one of the end plates and particularly the first end plate 24 of the starter motor 21.

The rotor support 65 is carried on the fixture 64 and in turn carried by the upper plate 49, as previously noted. This mechanism is supported for relative movement to the lower support plate 51 and specifically the stator casing-gripping device 54. A coil compression spring 67 is interposed between the upper support plate 49 and the fixture 64 for a purpose, which will become apparent shortly. There is a suitable stop (not shown) so as to limit the degree of downward movement of the fixture 64 under the action of the spring 67.

In accordance with the invention, there is provided a fixture 68 which is carried by the conveyor 47 and onto which is placed a sub-assembly, indicated generally by the reference numeral 69, which includes the front end plate 25 with the rotor 27 supported in the bearing 29 and seal 31 of this end plate 25. This mechanism moved forwardly to a position in registry with the stator holder 54 and rotor holder 65 by the conveyor 47.

A further conveyor mechanism, indicated by the reference numeral 71 and shown in FIG. 5, is provided at a side of the support plate 46 and presents stator cases 22 with mounted magnets 23 to the mechanism 54 so as to pick them up from the conveyor 74 and transfer to them a position over the conveyor 47 and the fixture 68 on which the assembly 69 consisting of the end plate 25 and rotor 27 has been positioned. The conveyor mechanism 71 is then retracted and the assembly moves to the position show in FIGS. 5 through 8.

Then, the cylinder 61 is activated so as to lower the support plates 49 and 51, the gripped stator case 22 and its gripping mechanism 54 as well as the rotor holder 65. This movement continues to the position shown in FIG. 9. At this time, the rotor 27 is then supported both at its upper and lower ends about its rotational axis and it will not be free to cant in the fixture 68.

The cylinder 53 is continuously activated so as to force the plates 49 and 51 downwardly and the plate 51 is free to slide relative to the plate 49 on the guide sleeves 48. This movement continues to permit the stator case 23 to encircle the rotor 27 without engaging the surfaces of the coils 33 or the cores of the armatures thereof. Thus, the stator case is then assembly on to the lower end plate 25 and it will be held against transverse movement relative to the rotor 27.

The mechanism is then moved backwardly from the position shown in FIG. 10 to the position shown in FIG. 9 and then to the position shown in FIG. 8. The operator can then insert the other end plate 24 and remove the assembly from the fixture 68 to insert the bolts 26 and complete the assembly of the starter motor 21.

Thus, it should be readily apparent that this construction permits a very easily assembled starter motor without having manual force necessary to hold the rotor 27 against transverse movement to the stator case 22 as would be normally caused by the attraction of the magnets 23.

Of course, the foregoing description is that of a preferred embodiment of the invention and it should be a parent to those skilled in the art that various changes and modification may be made without departing from the spirit and scope of the invention, as defined by the appended claims.

What is claimed is:

1. An assembling apparatus for a permanent field magnet, rotating electrical machine having a generally cylindrical stator case with permanent field magnets secured to an inside cylindrical surface of the stator case and a rotor that is journalled by paired front and rear end closures attached to the stator case, said assembling apparatus comprising a fixture for assembling and holding one of the end closures with one end of the rotor journalled therein, a rotor holder smaller than the inside cylindrical surface of the stator for holding the other end of the rotor in alignment with the rotational axis of the rotor defined by the held one end closure, and a stator case holder for holding the stator case and supported for movement along the rotor axis while holding the stator case, and a driver for assembling the stator case to said one of the end closures by relatively moving said stator case holder along the rotor axis while holding the other end of the rotor with the rotor holder.

2. The assembling apparatus for a permanent field magnet, rotating electrical machine as set forth in claim 1, wherein the rotor holder is supported for movement along the rotor axis and in telescopic relation to the stator case holder.

3. The assembling apparatus for a permanent field magnet, rotating electrical machine as set forth in claim 2, wherein the driver moves both the rotor holder and the stator case holder together until the rotor holder engages and holds the rotor in position and then moves only the stator case holder until the stare case engages the one end closure held in the fixture.

4. The assembling apparatus for permanent field magnet, rotating electrical machine as set forth in claim 1, wherein the outside cylindrical surface of the stator case is provided with an annular groove and the stator case holder comprises a pair of holding claws each having a generally arcuate engagement surface for engaging the annular groove.

5. The assembling apparatus for a permanent field magnet, rotating electrical machine as set forth in claim 4, wherein the holding claws are movable between a released position wherein the generally arcuate engagement surfaces of the holding claws are spaced radially outwardly from the outer periphery of the stator case and an engaged position with the annular groove.

6. The assembling apparatus for a permanent field magnet, rotating electrical machine as set forth in claim 4, wherein the annular groove is displaced from the position of the permanent magnets in the direction of the axis of the stator case.

7. The assembling apparatus to a permanent field magnet, rotating electrical machine as set forth in claim 5, wherein the rotor older is supported for movement along the rotor axis and in telescopic relation to the stator case holder.

8. The assembling apparatus for a permanent field magnet, rotating electrical machine as set forth in claim 7, wherein the driver moves both the rotor holder and the stator case holder together until the rotor holder engages and holds the rotor in position and then moves only the stator case holder until the stator case engages the one end closure.

* * * * *